US012709093B2

(12) United States Patent
Onuki

(10) Patent No.: US 12,709,093 B2
(45) Date of Patent: Aug. 18, 2026

(54) IMAGE FORMING APPARATUS AND IMAGE FORMING METHOD

(71) Applicant: Hajime Onuki, Kanagawa (JP)

(72) Inventor: Hajime Onuki, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 140 days.

(21) Appl. No.: 18/757,572

(22) Filed: Jun. 28, 2024

(65) Prior Publication Data

US 2025/0001766 A1 Jan. 2, 2025

(30) Foreign Application Priority Data

Jun. 30, 2023 (JP) ................................ 2023-108116

(51) Int. Cl.
*B41J 2/005* (2006.01)
*B41J 2/01* (2006.01)
*B41J 2/21* (2006.01)

(52) U.S. Cl.
CPC ............... *B41J 2/0057* (2013.01); *B41J 2/01* (2013.01); *B41J 2002/012* (2013.01); *B41J 2/211* (2013.01)

(58) Field of Classification Search
CPC ... B41J 2/0057; B41J 2/01; B41J 2/211; B41J 2002/012
See application file for complete search history.

(56) References Cited

U.S. PATENT DOCUMENTS

2019/0016116 A1* 1/2019 Imai .................... B41M 5/0256
2023/0139189 A1 5/2023 Onuki

FOREIGN PATENT DOCUMENTS

JP 2015-229241 A 12/2015
JP 2017007334 A * 1/2017 ......... G03G 15/2021
JP 2021-505445 A 2/2021
WO 2019/111187 A1 6/2019

* cited by examiner

*Primary Examiner* — Justin Seo
(74) *Attorney, Agent, or Firm* — XSENSUS LLP

(57) ABSTRACT

An image forming apparatus includes an intermediate transfer body, a first coating device to coat the intermediate transfer body with a pre-coating liquid, a second coating device to coat the intermediated transfer body coated with the pre-coating liquid with an ink containing a solvent and a resin dissolved in the solvent, in which the resin includes a coloring material, and to mix the pre-coating liquid and the solvent to deposit the resin at a gas-liquid interface on the intermediate transfer body, and a heater to heat the resin deposited at the gas-liquid interface on the intermediate transfer body.

8 Claims, 3 Drawing Sheets

IMAGE FORMING APPARATUS AND IMAGE FORMING METHOD

CROSS-REFERENCE TO RELATED APPLICATIONS

This patent application is based on and claims priority pursuant to 35 U.S.C. § 119(a) to Japanese Patent Application No. 2023-108116, filed on Jun. 30, 2023, in the Japan Patent Office, the entire disclosure of which is hereby incorporated by reference herein.

BACKGROUND

Technical Field

Embodiments of the present disclosure relate to an image forming apparatus and an image forming method.

Related Art

In an image forming apparatus that forms an image on a recording medium by coating the recording medium with ink, a technique in which the recording medium is coated with a solvent and a resin or a coloring material contained in the ink, and the solvent is removed is known.

In the related art, for example, a recording medium is coated with a first solvent, and the recording medium is coated with ink. The first solvent and a second solvent contained in the ink are mixed on the recording medium, and a resin contained in the ink is deposited. The absorbing roller is pressed against the recording medium, and the solvent on the recording medium is absorbed and removed from the recording medium.

SUMMARY

According to an embodiment of the present disclosure, an image forming apparatus includes an intermediate transfer body, a first coating device to coat the intermediate transfer body with a pre-coating liquid, a second coating device to coat the intermediated transfer body coated with the pre-coating liquid with an ink containing a solvent and a resin dissolved in the solvent, in which the resin includes a coloring material, and to mix the pre-coating liquid and the solvent to deposit the resin at a gas-liquid interface on the intermediate transfer body, and a heater to heat the resin deposited at the gas-liquid interface on the intermediate transfer body.

According to an embodiment of the present disclosure, an image forming method includes coating an intermediate transfer body with a pre-coating liquid, coating the intermediate transfer body coated with the pre-coating liquid with an ink containing: a solvent; and a resin dissolved in the solvent, in which the resin includes a coloring material, mixing the pre-coating liquid and the solvent to deposit the resin at a gas-liquid interface on the intermediate transfer body, heating the resin deposited at the gas-liquid interface on the intermediate transfer body, and transferring an image on a medium from the intermediate transfer body.

BRIEF DESCRIPTION OF THE DRAWINGS

A more complete appreciation of embodiments of the present disclosure and many of the attendant advantages and features thereof can be readily obtained and understood from the following detailed description with reference to the accompanying drawings, wherein.

Figure 1:
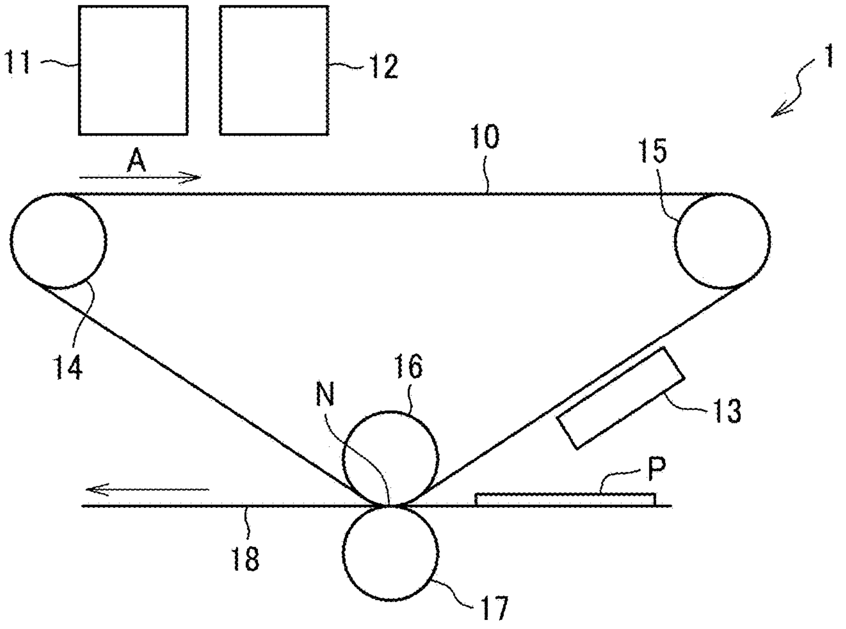
FIG. 1 is a schematic view of an image forming apparatus according to an embodiment of the present disclosure.

The accompanying drawings are intended to depict embodiments of the present disclosure and should not be interpreted to limit the scope thereof. The accompanying drawings are not to be considered as drawn to scale unless explicitly noted. Also, identical or similar reference numerals designate identical or similar components throughout the several views.

DETAILED DESCRIPTION

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result.

Referring now to the drawings, embodiments of the present disclosure are described below. As used herein, the singular forms "a," "an," and "the" are intended to include the plural forms as well, unless the context clearly indicates otherwise.

According to an embodiment of the present disclosure, the fixing property of an image to a recording medium can be increased.

Embodiments of the present disclosure will be described below with reference to the drawings. In the drawings, the same or like reference signs denote like elements having substantially the same or corresponding configurations, and descriptions thereof may be omitted.

As illustrated in FIG. 1, the image forming apparatus 1 according to an embodiment of the present disclosure includes an intermediate transfer body 10, a pre-coating liquid discharger 11 as a first coating device, an inkjet head 12 as a second coating device, a heater 13 as a heating device, a conveying roller 14, a conveying roller 15, a pressing roller 16, a transfer roller 17, and a conveying belt 18.

The intermediate transfer body 10 according to an embodiment of the present disclosure is an intermediate transfer belt. The intermediate transfer body 10 is stretched by the conveying roller 14, the conveying roller 15, and the pressing roller 16, and can circulate in the direction of the arrow A in FIG. 1. The direction of the arrow A is also referred to as the rotation direction of the intermediate transfer body 10.

In an embodiment of the present disclosure, an image forming apparatus includes an intermediate transfer body, a first coating device to coat the intermediate transfer body with a pre-coating liquid, a second coating device to coat the intermediated transfer body coated with the pre-coating liquid with an ink containing a solvent and a resin dissolved in the solvent, in which the resin includes a coloring material, and to mix the pre-coating liquid and the solvent to deposit the resin at a gas-liquid interface on the intermediate transfer body, and a heater to heat the resin deposited at the gas-liquid interface on the intermediate transfer body.

The pre-coating liquid discharger 11 coats the intermediate transfer body 10 with the pre-coating liquid. A portion of the intermediate transfer body 10 facing the pre-coating liquid discharger 11 is located at a coating position at which the intermediate transfer body 10 is coated with the pre-coating liquid. The pre-coating liquid discharger 11 according to an embodiment of the present disclosure has the same structure as the inkjet head 12 except that the liquid to be discharged is the pre-coating liquid. However, the first coating device may be a coating roller that coats an object with the pre-coating liquid.

The inkjet head 12 discharges ink to coat the intermediate transfer body 10 with ink. A portion of the intermediate transfer body 10 facing the inkjet head 12 is located at a coating position at which the intermediate transfer body 10 is coated with ink.

In an embodiment of the present disclosure, the image forming apparatus further includes a transfer roller contacting the intermediate transfer body and forming a nip with the intermediate transfer body to transfer an image on the intermediate transfer body on a medium. The intermediate transfer body includes a belt to rotate in a rotation direction, the second coating device coat the intermediated transfer body with the ink at a coating position, the heater is disposed between the coating position and the nip in the rotation direction.

The pressing roller 16 is brought into pressure contact with the transfer roller 17 via the intermediate transfer body 10 and the conveying belt 18, and forms a transfer nip N. The pressing roller 16 presses the intermediate transfer body 10 to the recording medium on the conveying belt 18. The conveying belt 18 conveys the recording medium P to the transfer nip N. An image is transferred from the intermediate transfer body 10 to the recording medium P at the transfer nip N. In other words, the transfer nip N is a transfer position at which an image is transferred to the recording medium P. The recording medium P according to an embodiment of the present disclosure is a sheet.

In an embodiment of the present disclosure, the image forming apparatus further includes a transfer roller contacting the intermediate transfer body and forming a nip with the intermediate transfer body to transfer an image on the intermediate transfer body on a medium. The intermediate transfer body includes a belt, and a heat roller in the belt to heat the resin on the belt and press the belt against the transfer roller to transfer the resin onto the medium between the belt and the transfer roller at the nip.

The heater 13 heats the surface of the intermediate transfer body 10. The heater 13 heats the intermediate transfer body 10 at a position downstream from the coating position of the pre-coating liquid or ink and upstream from the transfer position in the rotation direction of the intermediate transfer body 10.

Figure 2A:
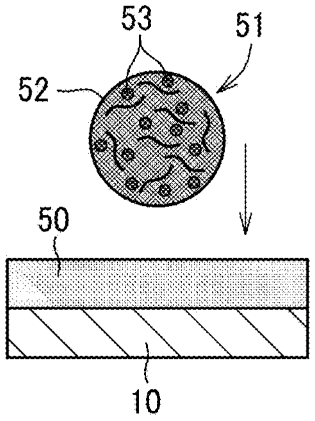
FIG. 2A is a diagram illustrating a state before mixing ink and a pre-coating liquid.
Figure 2B:
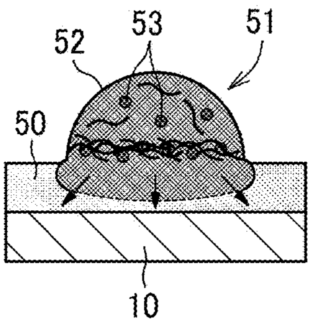
FIG. 2B is a diagram illustrating a state after mixing the ink and pre-coated liquid.
Figure 2C:
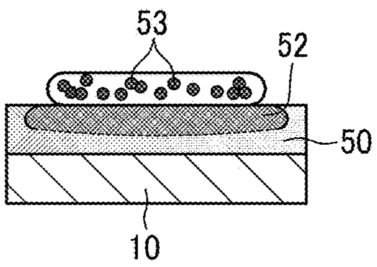
FIG. 2C is a diagram illustrating how a resin is deposited.

A method of forming an image on the recording medium P in the image forming apparatus 1 according to an embodiment of the present disclosure will be described below with reference to FIGS. 1 and 2A to 2C. FIGS. 2A and 2C are diagrams illustrating how the resin contained in the ink is deposited on the intermediate transfer body 10.

In an embodiment of the present disclosure, an image forming method includes coating an intermediate transfer body with a pre-coating liquid, coating the intermediate transfer body coated with the pre-coating liquid with an ink containing: a solvent; and a resin dissolved in the solvent, in which the resin includes a coloring material, mixing the pre-coating liquid and the solvent to deposit the resin at a gas-liquid interface on the intermediate transfer body, heating the resin deposited at the gas-liquid interface on the intermediate transfer body, and transferring an image on a medium from the intermediate transfer body.

When the image forming operation is started, the pre-coating liquid discharger 11 discharges the pre-coating liquid, and the intermediate transfer body 10 is coated with the pre-coating liquid. A portion of the intermediate transfer body 10 coated with the pre-coating liquid moves to a position facing the inkjet head 12 by circulating the intermediate transfer body 10 in the direction of the arrow A. As illustrated in FIG. 2A, the inkjet head discharges the ink 51 on the surface of the intermediate transfer body 10 coated with the pre-coating liquid 50.

The ink 51 contains a solvent 52, a resin 53 soluble in the solvent 52, and a coloring material (pigment).

The solvent 52 can be mixed with the pre-coating liquid 50. As illustrated in FIG. 2B, when the pre-coating liquid 50 is coated with the ink 51, the solvent 52 contained in the ink 51 moves to the pre-coating liquid 50, and the solvent 52 and the pre-coating liquid 50 are mixed. At this time, the resin 53 contained in the ink 51 is not dissolved in the pre-coating liquid 50, and thus the resin 53 and the coloring material are less likely to move to the pre-coating liquid 50. Further, the resin 53 has a density smaller than the densities of the pre-coating liquid 50 and the solvent 52. As a result, as illustrated in FIG. 2C, the resin 53 containing the coloring material is deposited on the gas-liquid interface (the upper side in FIG. 2C) of the intermediate transfer body 10. As described above, according to an embodiment of the present disclosure, the solvent and the pre-coating liquid unnecessary for image formation can be moved to the intermediate transfer body 10, and the resin 53 can be deposited on the gas-liquid interface without heating.

As illustrated in FIG. 1, the heater 13 heats the deposited resin by circulating the intermediate transfer body 10. Accordingly, the resin is softened to have adhesion. The heater 13 heats the resin 53 to a temperature equal to or higher than the glass transition point of the resin 53.

The portion of the intermediate transfer body 10 heated by the heater 13 moves to the transfer position by circulating the intermediate transfer body 10. At this timing, the recording medium P is conveyed to the transfer position. The intermediate transfer body 10 is pressed against the recording medium P at the transfer nip N, and the image on the intermediate transfer body 10 is transferred to the recording medium P. As described above, the transfer of the image to the recording medium P is completed.

As described above, according to an embodiment of the present disclosure, the resin 53 is deposited on the gas-liquid interface of the intermediate transfer body 10 in advance, and the resin 53 is efficiently heated. Accordingly, the resin 53 is likely to be softened and have more adhesion. Since the image is transferred to the recording medium P in this state, the fixing property of the image to the recording medium P can be increased.

Figure 3:
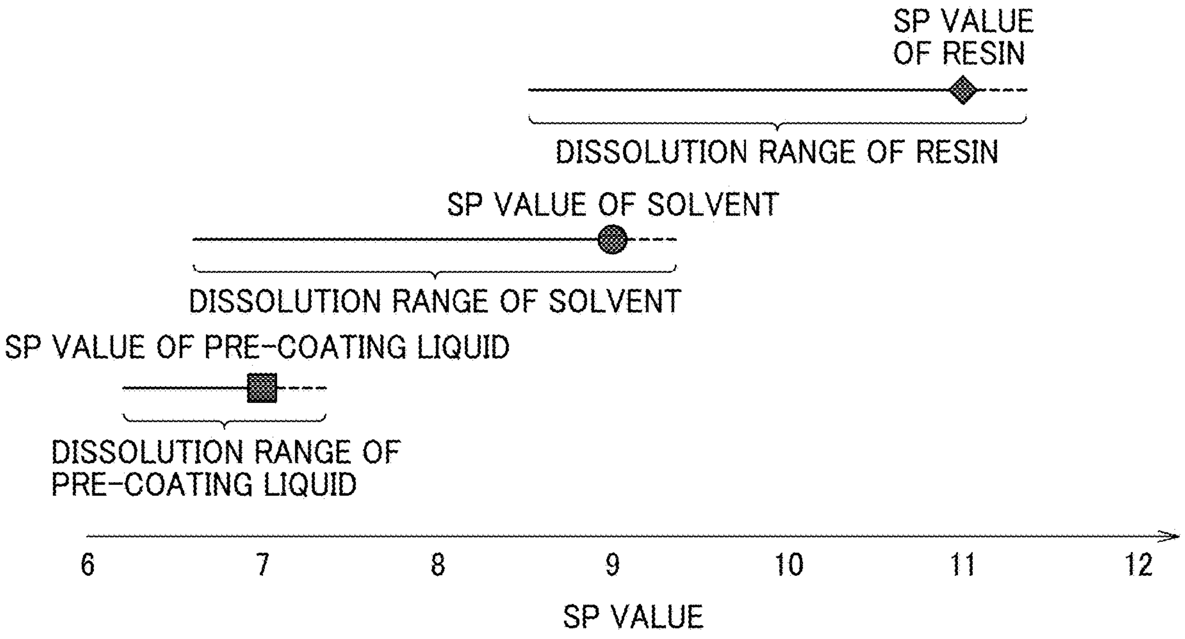
FIG. 3 is a diagram illustrating the solubility parameter value and dissolution ranges of the pre-coating liquid, the solvent, and the resin.

FIG. 3 is a diagram illustrating solubility parameter (SP) values and dissolution ranges of the pre-coating liquid, the solvent, and the resin.

As illustrated in FIG. 3, the SP value of the solvent 52 is a value between the SP value of the pre-coating liquid 50 and the SP value of the resin 53. The solvent 52 and the pre-coating liquid 50 in the ink have close SP values and the dissolution ranges of the solvent 52 and the pre-coating liquid 50 contained in the ink overlap each other, and the solvent 52 and the pre-coating liquid 50 can be mixed with each other. The solvent 52 has an SP value close to the SP value of the resin 53, and the dissolution ranges of the solvent 52 and the resin 53 overlap each other, so that the resin 53 is dissolved in the solvent 52. On the other hand, the SP values of the resin 53 and the pre-coating liquid 50 are separated from each other, and the dissolution ranges of the resin 53 and the pre-coating liquid 50 do not overlap with each other, and the resin 53 does not dissolve in the pre-coating liquid 50. Specifically, in the example of FIG. 3, the lower limit of the dissolution range of the resin 53 is set to be smaller than the upper limit of the dissolution range of the solvent 52 and larger than the upper limit of the dissolution range of the pre-coating liquid 50. In addition, the density of the resin 53 in the ink is set to be smaller than the density of the solvent 52 and the pre-coating liquid 50 in the ink 51, so that the resin 53 is moved to the gas-liquid interface and deposited when the intermediate transfer body 10 is coated with the pre-coating liquid 50 and the ink 51. The speed of mixing the pre-coating liquid 50 and the solvent 52 is higher than the speed of dissolving the resin 53 in the solvent 52. The lower limit of the solubility range of the solvent 52 is set to be smaller than the upper limit of the solubility range of the pre-coating liquid 50, and the solvent 52 and the pre-coating liquid 50 can be mixed with each other.

In an embodiment of the present disclosure, in the image forming apparatus, the solvent has a solubility parameter value between a solubility parameter value of the pre-coating liquid and a solubility parameter value of the resin.

In an embodiment of the present disclosure, in the image forming apparatus the resin in the ink has a density smaller than a density of the solvent and a density of the pre-coating liquid in the ink.

In an embodiment of the present disclosure, in the image forming apparatus, and sixth, and seventh aspects, a lower limit of a dissolution range of the solvent is smaller than an upper limit of a dissolution range of the pre-coating liquid.

Figures 4A, 4B:
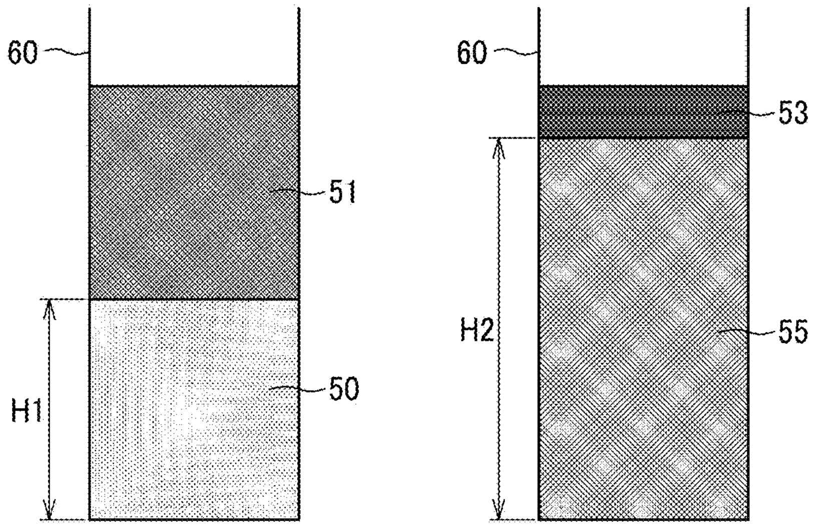
FIG. 4A is a diagram illustrating an evaluation test for evaluating a ratio of a solvent to be mixed with a pre-coating liquid before mixing.
FIG. 4B is a diagram illustrating the evaluation test for evaluating the ratio of the solvent to be mixed with the pre-coating liquid after mixing.

An evaluation test that confirms the mixing of the solvent in the ink and the pre-coating liquid will be described with reference to FIGS. 4A and 4B. FIG. 4A is a diagram illustrating the state before mixing, and FIG. 4B is a diagram illustrating the state after mixing.

As illustrated in FIG. 4A, first, the container 60 is filled with a predetermined amount of pre-coating liquid 50, and the container 60 is filled with a predetermined amount of ink 51. When a predetermined time elapses in this state, as illustrated in FIG. 4B, the pre-coating liquid 50 and the solvent 52 are mixed and move downward, and the resin 53 moves upward and is deposited. The resin 53 has a color different from the colors of the pre-coating liquid 50 and the solvent 52, and the boundary position of the resin 53 and the pre-coating liquid 50 and the solvent 52 can be visually identified. In this state, the amount of the solvent 52 mixed in the pre-coating liquid 50 can be evaluated by comparing the height H1 of the pre-coating liquid 50 before mixing illustrated in FIG. 4A with the height H2 of the pre-coating liquid 50 mixed with the solvent 52 illustrated in FIG. 4B. Further, what percentage of the solvent 52 in the ink 51 is mixed with the pre-coating liquid 50 can be calculated from the concentration of the solvent 52 in the ink 51 before mixing.

The state of the resin 53 on the intermediate transfer body 10 can be evaluated in a simple manner using such an evaluation method. The ratio of the solvent 52 to be mixed with the pre-coating liquid 50 is appropriately changed depending on the heating temperature of the heater 13, the type of the recording medium, for example, whether the solvent penetrates the recording medium. Accordingly, it is evaluated whether the solvent 52 is appropriately mixed with the pre-coating liquid 50 by the above-described evaluation method.

A modification of the image forming apparatus will be described with reference to FIG. 5.

Figure 5:
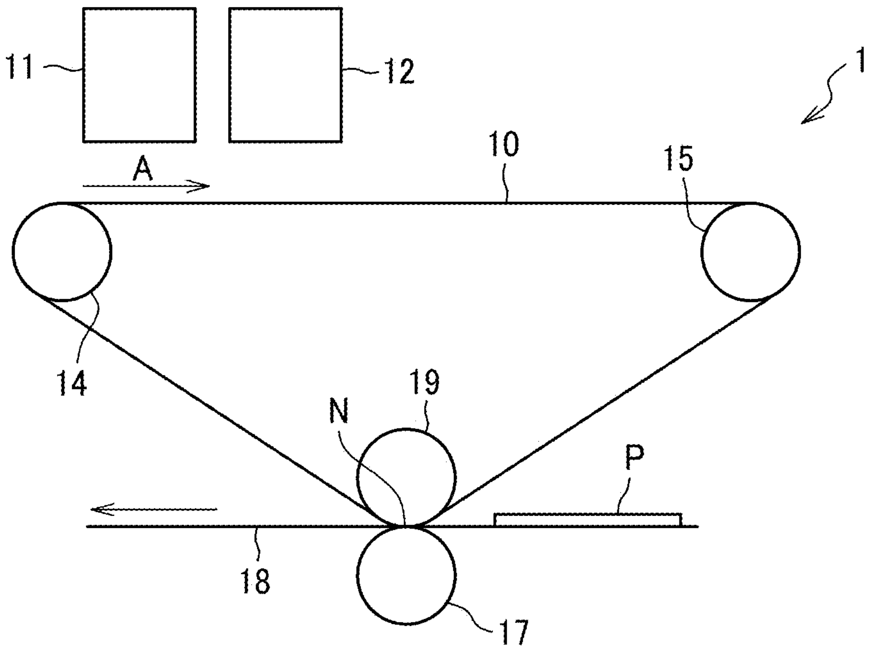
FIG. 5 is a schematic diagram illustrating a configuration of a modification of an image forming apparatus.

As illustrated in FIG. 5, in an embodiment of the present disclosure, a heat roller 19 is used as a heating device instead of the heater 13 of the above-described embodiment. The heat roller 19 is heated by a predetermined method such as having a heater therein. The heat roller 19 presses the transfer roller 17 from above the intermediate transfer body 10 and the conveying belt 18, and forms a transfer nip N between the heat roller 19 and the transfer roller 17.

According to an embodiment of the present disclosure, when the recording medium P is conveyed to the transfer nip N, the resin deposited on the intermediate transfer body 10 is heated by the heat roller 19, and the image on the intermediate transfer body 10 is transferred to the recording medium P. As described above, according to an embodiment of the present disclosure, the heating of the resin and the transfer of the image can be simultaneously performed at the transfer position.

Although the embodiments have been described above, the embodiments of the present disclosure are not limited to the configurations described above. The embodiments of the present disclosure may be modified without departing from the scope or spirit of the disclosure and may be determined appropriately in accordance with applications.

The recording medium may be, for example, a sheet (plain paper), thick paper, a postcard, an envelope, thin paper, coated paper (coated paper, or art paper), tracing paper, an overhead projection (OHP) sheet, a plastic film, a prepreg, or a copper foil.

Aspects of the present invention are as follows.

First Aspect

An image forming apparatus includes an intermediate transfer body, a first coating device to coat the intermediate transfer body with a pre-coating liquid, a second coating device to coat the intermediated transfer body coated with the pre-coating liquid with an ink containing a solvent and a resin dissolved in the solvent, in which the resin includes a coloring material, and to mix the pre-coating liquid and the solvent to deposit the resin at a gas-liquid interface on the intermediate transfer body, and a heater to heat the resin deposited at the gas-liquid interface on the intermediate transfer body.

Second Aspect

The image forming apparatus according to the first aspect further includes a transfer roller contacting the intermediate transfer body and forming a nip with the intermediate transfer body to transfer an image on the intermediate transfer body on a medium. The intermediate transfer body includes a belt to rotate in a rotation direction, the second coating device coat the intermediated transfer body with the ink at a coating position, the heater is disposed between the coating position and the nip in the rotation direction.

Third Aspect

The image forming apparatus according to the first aspect further includes a transfer roller contacting the intermediate transfer body and forming a nip with the intermediate transfer body to transfer an image on the intermediate transfer body on a medium. The intermediate transfer body includes a belt, and a heat roller in the belt to heat the resin on the belt and press the belt against the transfer roller to transfer the resin onto the medium between the belt and the transfer roller at the nip.

Fourth Aspect

In the image forming apparatus according to any one of the first to third aspect aspects, the solvent has a solubility parameter value between a solubility parameter value of the pre-coating liquid and a solubility parameter value of the resin.

Fifth Aspect

An image forming method includes coating an intermediate transfer body with a pre-coating liquid, coating the intermediate transfer body coated with the pre-coating liquid with an ink containing: a solvent; and a resin dissolved in the solvent, in which the resin includes a coloring material, mixing the pre-coating liquid and the solvent to deposit the resin at a gas-liquid interface on the intermediate transfer body, heating the resin deposited at the gas-liquid interface on the intermediate transfer body, and transferring an image on a medium from the intermediate transfer body.

Sixth Aspect

In the image forming apparatus according to any one of the first to fourth aspects, the resin in the ink has a density smaller than a density of the solvent and a density of the pre-coating liquid in the ink.

Seventh Aspect

In the image forming apparatus according to any one of the first to fourth, and sixth aspects, a speed of mixing the pre-coating liquid and the solvent is faster than a speed of dissolving the resin in the solvent.

Eighth Aspect

In the image forming apparatus according to any one of the first to fourth, and sixth, and seventh aspects, a lower limit of a dissolution range of the solvent is smaller than an upper limit of a dissolution range of the pre-coating liquid.

The above-described embodiments are illustrative and do not limit the present invention. Thus, numerous additional modifications and variations are possible in light of the above teachings. For example, elements and/or features of different illustrative embodiments may be combined with each other and/or substituted for each other within the scope of the present invention. Any one of the above-described operations may be performed in various other ways, for example, in an order different from the one described above.

The invention claimed is:

1. An image forming apparatus comprising:

an intermediate transfer body;

a first coating device to coat the intermediate transfer body with a pre-coating liquid;

a second coating device to:

coat the intermediated transfer body coated with the pre-coating liquid with an ink containing:

a solvent; and a resin dissolved in the solvent, the resin including a coloring material; and mix the pre-coating liquid and the solvent so that the resin accumulates at a gas-liquid interface on the intermediate transfer body; and a heater to heat the resin at the gas-liquid interface on the intermediate transfer body.

2. The image forming apparatus according to claim 1, further comprising a transfer roller contacting the intermediate transfer body and forming a nip with the intermediate transfer body to transfer an image on the intermediate transfer body on a medium, wherein the intermediate transfer body includes a belt to rotate in a rotation direction, the second coating device coat the intermediated transfer body with the ink at a coating position, the heater is disposed between the coating position and the nip in the rotation direction.

3. The image forming apparatus according to claim 1, further comprising a transfer roller contacting the intermediate transfer body and forming a nip with the intermediate transfer body to transfer an image on the intermediate transfer body on a medium, wherein the intermediate transfer body includes:

a belt; and a heat roller in the belt to:

heat the resin on the belt; and press the belt against the transfer roller to transfer the resin onto the medium between the belt and the transfer roller at the nip.

4. The image forming apparatus according to claim 1, wherein the solvent has a solubility parameter value between a solubility parameter value of the pre-coating liquid and a solubility parameter value of the resin.

5. An image forming method comprising:

coating an intermediate transfer body with a pre-coating liquid;

coating the intermediate transfer body coated with the pre-coating liquid with an ink containing: a solvent; and a resin dissolved in the solvent, the resin including a coloring material;

mixing the pre-coating liquid and the solvent so that the resin accumulates at a gas-liquid interface on the intermediate transfer body;

heating the resin at the gas-liquid interface on the intermediate transfer body; and transferring an image onto a medium from the intermediate transfer body.

6. The image forming apparatus according to claim 1, wherein the resin in the ink has a density smaller than a density of the solvent and a density of the pre-coating liquid in the ink.

7. The image forming apparatus according to claim 1, wherein a speed of mixing the pre-coating liquid and the solvent is faster than a speed of dissolving the resin in the solvent.

8. The image forming apparatus according to claim 1, wherein a lower limit of a dissolution range of the solvent is smaller than an upper limit of a dissolution range of the pre-coating liquid.

* * * * *